United States Patent
Ando et al.

(10) Patent No.: US 7,657,362 B2
(45) Date of Patent: Feb. 2, 2010

(54) VEHICLE AND CONTROL METHOD OF VEHICLE

(75) Inventors: Daigo Ando, Nisshin (JP); Kazuhiro Ichimoto, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 278 days.

(21) Appl. No.: 11/884,950

(22) PCT Filed: Mar. 22, 2006

(86) PCT No.: PCT/JP2006/306394

§ 371 (c)(1),
(2), (4) Date: Aug. 23, 2007

(87) PCT Pub. No.: WO2006/101253

PCT Pub. Date: Sep. 28, 2006

(65) Prior Publication Data

US 2008/0275626 A1 Nov. 6, 2008

(30) Foreign Application Priority Data

Mar. 25, 2005 (JP) ............................. 2005-087536

(51) Int. Cl.
*F02D 29/02* (2006.01)
*G06F 19/00* (2006.01)
(52) U.S. Cl. ..................................... 701/106
(58) Field of Classification Search ................. 701/106, 701/102, 115
See application file for complete search history.

(56) References Cited

U.S. PATENT DOCUMENTS

| 7,406,378 B2 * | 7/2008 | Harada et al. ............... 701/103 |
| 2001/0009147 A1 | 7/2001 | Takashima et al. |
| 2003/0087724 A1 | 5/2003 | Seibertz et al. |

FOREIGN PATENT DOCUMENTS

| DE | 33 03 467 A1 | 9/1983 |
| EP | 0 908 619 A1 | 4/1999 |
| EP | 1 052 399 A2 | 11/2000 |
| EP | 1 382 842 A | 1/2004 |
| JP | 02-091444 | 3/1990 |
| JP | 11-107834 | 4/1999 |
| JP | 2002-276409 A | 9/2002 |
| JP | 2004-352086 A | 12/2004 |
| JP | 2005-061278 A | 3/2005 |

* cited by examiner

*Primary Examiner*—Hieu T Vo
(74) *Attorney, Agent, or Firm*—Kenyon & Kenyon LLP

(57) ABSTRACT

In a vehicle equipped with both an engine and a motor as the driving power source, in the event of incompletion of learning a control demand for regulation of an idling rotation speed of the engine, intermittent operation prohibition control of the invention permits intermittent operation of the engine under the setting of a gearshift lever to a parking position. The intermittent operation prohibition control of the invention prohibits the intermittent operation of the engine, on the other hand, under the setting of the gearshift lever to a drive position. This arrangement avoids the continuous operation of the engine against the driver's expectation, while prohibiting the intermittent operation of the engine to ensure the opportunity of learning the control demand for regulation of the idling rotation speed of the engine.

9 Claims, 2 Drawing Sheets

VEHICLE AND CONTROL METHOD OF VEHICLE

This is a 371 national phase application of PCT/JP2006/306394 filed 22 Mar. 2006, which claims priority to Japanese Patent Application No. 2005-087536, filed 25 Mar. 2005, the contents of which are incorporated herein by reference.

TECHNICAL FIELD

The present invention relates to a vehicle driven with an intermittently-operable internal combustion engine, as well as to a corresponding control method of such a vehicle.

BACKGROUND ART

One proposed technique applied to a vehicle equipped with an engine is, in the event of incompletion of learning a control demand for feedback control of at a throttle opening for regulation of an idling rotation speed of the engine to a target idling rotation speed, to prohibit stopping the engine until completion of the learning (see, for example, Japanese Patent Laid-Open Gazette No. H11-107834). This technique does not stop the engine of the vehicle until completion of learning the control demand for regulation of the idling rotation speed. This proposed technique may be applied to a hybrid vehicle with less opportunities of learning the control demand for regulation of the idling rotation speed. In such application, setting an appropriate learning value and adequate reflection of the learning value on the feedback control of the throttle opening attain favorable idling operation of the engine.

DISCLOSURE OF THE INVENTION

The technique of this prior art vehicle unconditionally prohibits the stop of the engine and keeps the operation of the engine until completion of learning the control demand for regulation of the idling rotation speed. In some cases, such continuous operation of the engine may be against the driver's expectation and may cause the driver to feel something is wrong.

The vehicle and the vehicle control method of the invention thus aim to ensure an opportunity of learning a control demand for idling operation of an internal combustion engine without causing a driver to feel something is wrong.

In order to attain at least part of the above and the other related objects, the vehicle and control method of the vehicle have the configurations discussed below.

The present invention is directed to a vehicle that is driven with an intermittently-drivable internal combustion engine. The vehicle includes: an idling control demand learning module that learns a control demand for idling operation of the internal combustion engine; and an intermittent operation prohibition module that, in the event of incompletion of learning the control demand by the idling control demand learning module, prohibits intermittent operation of the internal combustion engine corresponding to presence or absence of a driver's preset operation until completion of the learning.

In the event of incompletion of learning the control demand for idling operation of the internal combustion engine, the vehicle of the invention prohibits the intermittent operation of the internal combustion engine corresponding to the driver's preset operation until completion of the learning. This arrangement effectively avoids the continuous operation of the internal combustion engine against the driver's expectation, while prohibiting the intermittent operation of the internal combustion engine. This arrangement desirably ensures the opportunity of learning the control demand for idling operation of the internal combustion engine without causing the driver to feel something is wrong. The driver's preset operation is, for example, an operation causing the driver to expect the intermittent operation of the internal combustion engine.

In one preferable application of the vehicle of the invention, the intermittent operation prohibition module prohibits the intermittent operation of the internal combustion engine, in response to the driver's gearshift operation. This application adequately prohibits the intermittent operation of the internal combustion engine. In one example of this application, the intermittent operation prohibition module permits the intermittent operation of the internal combustion engine in response to the driver's gearshift operation to a parking position, while prohibiting the intermittent operation of the internal combustion engine in response to the driver's gearshift operation to a drivable position other than the parking position.

In another preferable application of the vehicle of the invention, the intermittent operation prohibition module prohibits the intermittent operation of the internal combustion engine, in response to the driver's operation of a parking brake. This application adequately prohibits the intermittent operation of the internal combustion engine.

In still another preferable application of the vehicle of the invention, the vehicle includes a motor for driving the vehicle. The vehicle of the invention further includes; a three shaft-type power input output mechanism that is linked to three shafts, an output shaft of the internal combustion engine, a driveshaft connected to an axle, and a third shaft, and inputs and outputs power from and to a residual one shaft based on powers input from and output to any two shafts among the three shafts; and a generator that inputs and outputs power from and to the third shaft.

The present invention is also directed to a vehicle control method of controlling a vehicle that is driven with an intermittently-drivable internal combustion engine. The vehicle control method including the steps of: (a) learning a control demand for idling operation of the internal combustion engine; and (b) in the event of incompletion of learning the control demand in said step (a), prohibiting intermittent operation of the internal combustion engine corresponding to presence or absence of a driver's preset operation until completion of the learning.

In the event of incompletion of learning the control demand for idling operation of the internal combustion engine, the control method of the invention prohibits the intermittent operation of the internal combustion engine corresponding to the driver's preset operation until completion of the learning. This arrangement effectively avoids the continuous operation of the internal combustion engine against the driver's expectation, while prohibiting the intermittent operation of the internal combustion engine. This arrangement desirably ensures the opportunity of learning the control demand for idling operation of the internal combustion engine without causing the driver to feel something is wrong.

In one preferable application of the control method of the invention, the step (b) permits the intermittent operation of the internal combustion engine in response to the driver's gearshift operation to a parking position as the driver's preset operation, while prohibiting the intermittent operation of the internal combustion engine in response to the driver's gearshift operation to a drivable position other than the parking position as the driver's preset operation.

BEST MODES OF CARRYING OUT THE INVENTION

Figure 1:
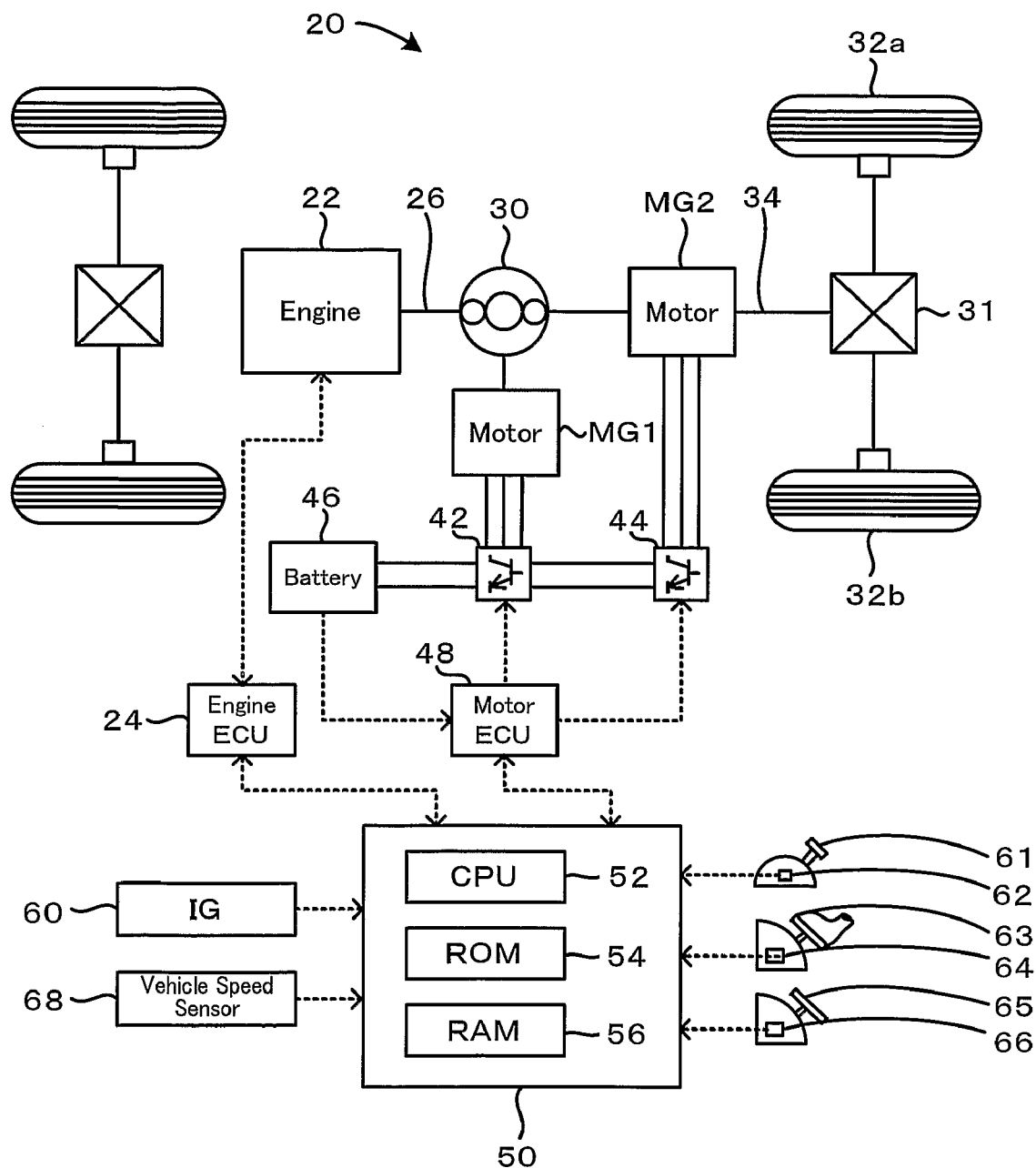
FIG. 1 schematically illustrates the configuration of a vehicle in one embodiment of the invention.

One mode of carrying out the invention is discussed below as a preferred embodiment with reference to the accompanied drawings. FIG. 1 schematically illustrates the configuration of a vehicle 20 in one embodiment of the invention. As illustrated in FIG. 1, the vehicle 20 of the embodiment includes an engine 22, an engine electronic control unit 24 (hereafter referred to as engine ECU 24) that operates and controls the engine 22, and a planetary gear unit 30 that includes a carrier connected to a crankshaft 26 or an output shaft of the engine 22 and a ring gear connected to a driveshaft 34 linked to drive wheels 32a and 32b via a differential gear 31. The vehicle 20 further includes a motor MG1 that is connected to a sun gear of the planetary gear unit 30 and has power generation capability, a motor MG2 that is connected to the driveshaft 34 and has power generation capability, a battery 46 that transmits electric power to and from the motors MG1 and MG2 via inverters 42 and 44, a motor electronic control unit 48 (hereafter referred to as motor ECU 48) that operates and controls the motors MG1 and MG2, and a hybrid electronic control unit 50 that controls the operations of the whole vehicle 20.

The engine ECU 24 receives diverse signals from various sensors that measure and detect the operating conditions of the engine 22 and performs fuel injection control, ignition control, and air intake flow regulation. On an initial start-up of the engine 22 at a start of the vehicle 20, the engine ECU 24 learns a control demand (for example, a throttle opening demand) required to regulate an idling rotation speed to a target idling rotation speed when the temperature of cooling water in the engine 22 rises to or above a preset level. The engine ECU stores this learnt control demand and uses the learnt control demand for subsequent control of the idling operation of the engine 22. The engine ECU 24 also stores information regarding a learning status of the control demand for regulation of the idling rotation speed, that is, completion or incompletion of learning the control demand.

The motor ECU 48 receives diverse signals from various sensors that measure and detect the operating conditions of the motors MG1 and MG2 and performs switching control of switching elements included in the respective inverters 42 and 44.

The hybrid electronic control unit 50 is constructed as a microprocessor including a CPU 52, a ROM 54 that stores processing programs, a RAM 56 that temporarily stores data, input and output ports (not shown), and a communication port (not shown). The hybrid electronic control unit 50 receives, via its input port, an ignition signal from an ignition switch 60, a gearshift position SP or a current setting position of a gearshift lever 61 from a gearshift position sensor 62, an accelerator opening Acc or the driver's depression amount of an accelerator pedal 63 from an accelerator pedal position sensor 64, a brake pedal position BP or the driver's depression amount of a brake pedal 65 from a brake pedal position sensor 66, and a vehicle speed V from a vehicle speed sensor 68. The hybrid electronic control unit 50 establishes communication with the engine ECU 24 and the motor ECU 48 via its communication port to receive and send a diversity of control signals and data from and to the engine ECU 24 and the motor ECU 48.

The vehicle 20 of the embodiment having the above construction sets a torque demand to be output to the driveshaft 34 corresponding to the given vehicle speed V and the given accelerator opening Acc (equivalent to the driver's depression amount of the accelerator pedal 63), and drives and controls the engine 22 and the motors MG1 and MG2 to ensure output of a power demand equivalent to the preset torque demand. There are several drive control modes of the engine 22 and the motors MG1 and MG2. In a torque conversion drive mode, while the engine 22 is driven and controlled to output a required level of power corresponding to the power demand, the motors MG1 and MG2 are driven and controlled to enable all the output power of the engine 22 to be subjected to torque conversion by the planetary gear unit 30 and the motors MG1 and MG2 and to be output to the driveshaft 34. In a charge-discharge drive mode, the engine 22 is driven and controlled to output a required level of power corresponding to the sum of the power demand and electric power used to charge the battery 46 or discharged from the battery 46. The motors MG1 and MG2 are driven and controlled to enable all or part of the output power of the engine 22, which is equivalent to the power demand with charge or discharge of the battery 46, to be subjected to torque conversion by the planetary gear unit 30 and the motors MG1 and MG2 and to be output to the driveshaft 34. In a motor drive mode, the motor MG2 is driven and controlled to ensure output of a required level of power corresponding to the power demand to the driveshaft 34, while the engine 22 stops. The torque conversion drive mode is equivalent to the charge-discharge drive mode with charge-discharge electric power of the battery 46 equal to 0. Namely the torque conversion drive mode is regarded as one behavior of the charge-discharge drive mode. The vehicle 20 of the embodiment accordingly drives with a changeover of the drive control between the motor drive mode and the charge-discharge drive mode.

In the vehicle 20 of the embodiment driven in the charge-discharge drive mode, auto stop conditions of the engine 22 are satisfied when the remaining charge or the state of charge SOC of the battery 46 enters a preset management range and a vehicle power demand set corresponding to the driver's depression amount of the accelerator pedal 63 decreases below a preset first reference level, for example, 2 or 3 kW, 5 kW, 7 kW, or 10 kW. Upon satisfaction of these engine auto stop conditions, the vehicle 20 automatically stops the engine 22 and changes over the drive control to the motor drive mode. In the vehicle 20 of the embodiment driven in the motor drive mode, auto start conditions of the engine 22 are satisfied when the vehicle power demand set corresponding to the driver's depression amount of the accelerator pedal 63 increases to or above a preset second reference level, for example, 4 or 5 kW, 8 kW, 10 kW, or 15 kW, which is higher than the preset first reference level, or when the state of charge SOC of the battery 46 lowers than the preset management range. Upon satisfaction of these engine auto start conditions, the vehicle 20 automatically restarts the engine 22 from a stop and changes over the drive control to the charge-discharge drive mode.

Figure 2:
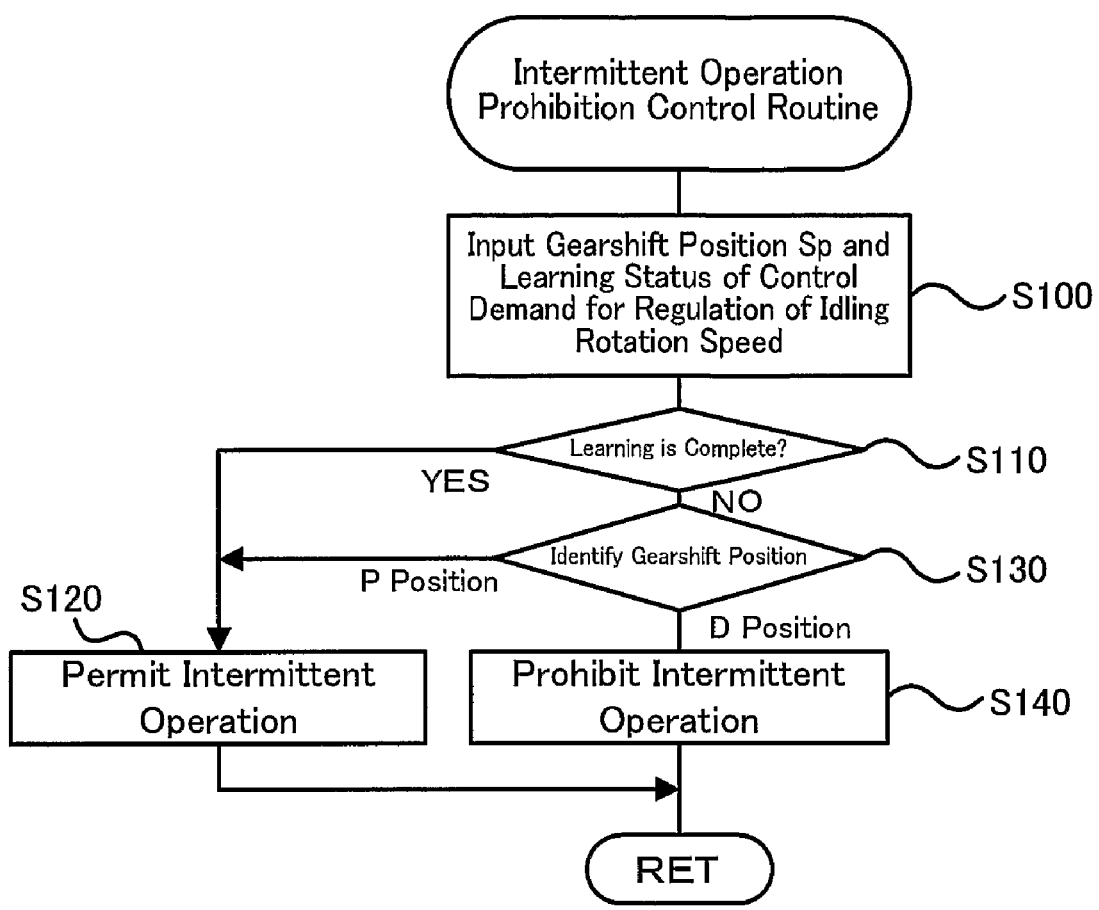
FIG. 2 is a flowchart showing an intermittent operation prohibition control routine executed by a hybrid electronic control unit mounted on the vehicle of the embodiment.

The description regards a control process of prohibiting an auto stop (intermittent operation) of the engine 22 regardless of satisfaction of the above engine auto stop conditions. FIG. 2 is a flowchart showing an intermittent operation prohibition control routine executed by the hybrid electronic control unit 50. This intermittent operation prohibition control routine is executed repeatedly at preset time intervals.

In the intermittent operation prohibition control routine of FIG. 2, the CPU 52 of the hybrid electronic control unit 50 first inputs various data required for control, for example, the gearshift position SP from the gearshift position sensor 62 and the learning status of the control demand for regulation of the idling rotation speed of the engine 22 (step S100). The learning status of the control demand for regulation of the idling rotation speed of the engine 22 is expressed, for example, by a flag that is set to 1 representing completion of learning and is reset to 0 representing incompletion of learning. The learning status of the control demand is received from the engine ECU 24 by communication.

After the data input, the CPU 52 identifies completion or incompletion of learning the control demand for regulation of the idling rotation speed (step S110). In response to completion of learning the control demand for regulation of the idling rotation speed at step S110, the CPU 52 permits the intermittent operation of the engine 22 (step S120) and exits from this intermittent operation prohibition control routine. The permission of the intermittent operation enables the vehicle 20 to automatically stop the engine 22 and to be driven in the motor drive mode upon satisfaction of the engine auto stop conditions given above, while enabling the vehicle 20 to automatically restart the engine 22 and to be driven in the charge-discharge drive mode upon satisfaction of the engine auto stop conditions given above.

In response to incompletion of learning the control demand for regulation of the idling rotation speed at step S110, on the other hand, the CPU 52 identifies the input gearshift position SP (step S130). In the setting of the identified gearshift position SP to an undrivable position, for example, a parking (P) position, the CPU 52 permits the intermittent operation of the engine 22 (step S120). In the setting of the identified gearshift position SP to a drivable position, for example, a drive (D) position, on the other hand, the CPU 52 prohibits the intermittent operation of the engine 22 (step S140) and exits from this intermittent operation prohibition control routine. The prohibition of the intermittent operation does not allow the vehicle 20 to automatically stop the engine 22 regardless of satisfaction of the engine auto stop conditions. In the event of incompletion of learning the control demand for regulation of the idling rotation speed, the intermittent operation of the engine 22 is prohibited under the gearshift position SP set to the D position. Such prohibition of the intermittent operation of the engine 22 ensures the opportunity of learning the control demand for regulation of the idling rotation speed and completes learning at an earlier timing to enable stable idling operation of the engine 22. In the event of incompletion of learning the control demand for regulation of the idling rotation speed, the intermittent operation of the engine 22 is permitted, on the other hand, under the gearshift position SP set to the P position. The driver generally expects a stop of the engine 22 under the gearshift position SP set to the P position. Such permission of the intermittent operation of the engine 22 avoids the continuous operation of the engine 22 against the driver's expectation and accordingly prevents the driver from feeling something is wrong.

As described above, in the event of incompletion of learning the control demand for regulation of the idling rotation speed, the vehicle 20 of the embodiment with the gearshift level 61 set to the D position prohibits the intermittent operation of the engine 22 until completion of learning the control demand for regulation of the idling rotation speed. The vehicle 20 with the gearshift lever 61 set to the P position, on the other hand, permits the intermittent operation of the engine 22. The vehicle 20 of the embodiment thus effectively avoids the continuous operation of the engine 22 against the driver's expectation, while prohibiting the intermittent operation of the engine 22 until completion of learning the control demand for regulation of the idling rotation speed. This arrangement ensures the opportunity of learning the control demand for regulation of the idling rotation speed without causing the driver to feel something is wrong.

In the event of incompletion of learning the control demand for regulation of the idling rotation speed of the engine 22, the vehicle 20 of the embodiment prohibits the intermittent operation of the engine 22, based on the gearshift position SP. Such prohibition control of the embodiment is, however, not restrictive at all. Prohibition of the intermittent operation of the engine 22 may be determined in response to the driver's any other operation that expects the intermittent operation of the engine 22. The intermittent operation of the engine 22 may be prohibited, for example, in response to the driver's operation of a parking brake, the driver's open-close operation of a door of the vehicle 20, or a combination of such driver's operations. In the modified structure of prohibiting the intermittent operation of the engine 22 corresponding to activation or inactivation of the parking brake, in the event of incompletion of learning the control demand for regulation of the idling rotation speed of the engine 22, the intermittent operation prohibition control permits the intermittent operation of the engine 22 in response to the driver's ON operation of the parking brake, while prohibiting the intermittent operation of the engine 22 in response to the driver's OFF operation of the parking brake.

The embodiment regards application of the invention to the vehicle 20 equipped with the engine 22, the planetary gear unit 30, and the motors MG1 and MG2. The technique of the invention is, however, not restricted to the vehicle 20 of this configuration but is also applicable to hybrid vehicles of other configurations having both an engine and a motor as the driving power source as well as to conventional motor vehicles having only an engine as the driving power source. The requirement for the vehicle with application of the invention is to have an intermittently drivable engine that automatically stops upon satisfaction of the engine auto stop conditions and automatically restarts upon satisfaction of the engine auto start conditions.

The embodiment discussed above is to be considered in all aspects as illustrative and not restrictive. There may be many modifications, changes, and alterations without departing from the scope or spirit of the main characteristics of the present invention. All changes within the meaning and range of equivalency of the claims are intended to be embraced therein.

INDUSTRIAL APPLICABILITY

The technique of the invention is preferably applied to automobile industries and other relevant industries.

The invention claimed is:

1. A vehicle that is driven with an intermittently-drivable internal combustion engine, said vehicle comprising:
   an idling control demand learning module that learns a control demand for idling operation of the internal combustion engine; and
   an intermittent operation prohibition module that, in the event of incompletion of learning the control demand by said idling control demand learning module, prohibits intermittent operation of the internal combustion engine corresponding to presence or absence of a driver's preset operation until completion of the learning.

2. A vehicle in accordance with claim 1, wherein the driver's preset operation causes the driver to expect the intermittent operation of the internal combustion engine.

3. A vehicle in accordance with claim 1, wherein said intermittent operation prohibition module prohibits the intermittent operation of the internal combustion engine, in response to the driver's gearshift operation.

4. A vehicle in accordance with claim 3, wherein said intermittent operation prohibition module permits the intermittent operation of the internal combustion engine in response to the driver's gearshift operation to a parking position as the driver's preset operation, while prohibiting the intermittent operation of the internal combustion engine in response to the driver's gearshift operation to a drivable position other than the parking position as the driver's preset operation.

5. A vehicle in accordance with claim 1, wherein said intermittent operation prohibition module prohibits the intermittent operation of the internal combustion engine, in response to the driver's operation of a parking brake.

6. A vehicle in accordance with claim 1, said vehicle further comprising:
 a motor for driving said vehicle.

7. A vehicle in accordance with claim 6, said vehicle further comprising:
 a three shaft-type power input output mechanism that is linked to three shafts, an output shaft of the internal combustion engine, a driveshaft connected to an axle, and a third shaft, and inputs and outputs power from and to a residual one shaft based on powers input from and output to any two shafts among the three shafts; and
 a generator that inputs and outputs power from and to the third shaft.

8. A vehicle control method of controlling a vehicle that is driven with an intermittently-drivable internal combustion engine,
 said vehicle control method comprising the steps of:
 (a) learning a control demand for idling operation of the internal combustion engine; and
 (b) in the event of incompletion of learning the control demand in said step (a), prohibiting intermittent operation of the internal combustion engine corresponding to presence or absence of a driver's preset operation until completion of the learning.

9. A vehicle control method in accordance with claim 8, wherein said step (b) permits the intermittent operation of the internal combustion engine in response to the driver's gearshift operation to a parking position as the driver's preset operation, while prohibiting the intermittent operation of the internal combustion engine in response to the driver's gearshift operation to a drivable position other than the parking position as the driver's preset operation.

* * * * *